United States Patent [19]
Bruder et al.

[11] Patent Number: 5,161,094
[45] Date of Patent: Nov. 3, 1992

[54] SOLID ELECTROLYTE CAPACITOR AND METHOD OF MAKING

[75] Inventors: John F. Bruder, Phoenix; Laurence N. Swink, Tempe, both of Ariz.

[73] Assignee: Quadri Electronics Corporation, Chandler, Ariz.

[21] Appl. No.: 756,315

[22] Filed: Sep. 6, 1991

Related U.S. Application Data

[63] Continuation-in-part of Ser. No. 562,234, Aug. 3, 1990, Pat. No. 5,047,899.

[51] Int. Cl.$^5$ .......................... H01G 9/00; H02J 7/04
[52] U.S. Cl. ........................................ 361/502; 320/15
[58] Field of Search .................. 29/25.03; 361/502; 363/16, 19; 340/636; 320/1, 15, 20, 21, 40, 48

[56] References Cited

U.S. PATENT DOCUMENTS

| | | | |
|---|---|---|---|
| 3,443,997 | 5/1969 | Argoe et al. | 136/83 |
| 3,476,605 | 11/1969 | Owens | 136/83 |
| 3,476,606 | 11/1969 | Owens | 136/83 |
| 3,503,810 | 3/1970 | Grocs | 136/120 |
| 3,647,549 | 3/1972 | Christie et al. | 136/83 |
| 3,663,299 | 5/1972 | Owens et al. | 136/83 |
| 3,701,685 | 10/1972 | Ervin, III | 136/83 |
| 4,387,332 | 6/1983 | Oyamada et al. | 320/15 |
| 4,654,769 | 3/1987 | Middlebrook | 363/16 |
| 4,916,438 | 4/1990 | Collins et al. | 340/636 |
| 4,959,603 | 9/1990 | Yamamoto et al. | 320/1 |
| 4,984,145 | 1/1991 | Dangschat et al. | 363/19 |

OTHER PUBLICATIONS

"Applications of Halogenide Solid Electrolytes", by B. B. Owens, J. E. Oxley, and A. F. Sammells, pp. 67-104.
"A Solid State Electrochemical Capacitor", by J. E. Oxley, Abstract No. 175, pp. 446-447.
"Solid State Energy Storage Device", by J. E. Oxley, Session on Secondary Batteries, pp. 20-23.
"Solid Electrolyte Batteries", by B. B. Owens, pp. 28-30.

Primary Examiner—Donald Griffin
Attorney, Agent, or Firm—Cahill, Sutton & Thomas

[57] ABSTRACT

A technique is disclosed for supplying backup power by providing a solid-state electrochemical capacitor with a layer of solid electrolyte material composed of $RbAg_4I_5$, a layer of anode material composed of carbon and $RbAg_4I_5$ adjoining a first surface of the electrolyte material, and a layer of cathode material composed of carbon and $RbAg_4I_5$ adjoining a second surface of the electrolyte material. A current is supplied to charge the anode of the capacitor structure to a voltage in the range from 0.50 volts to 0.66 volts to cause storage of charge in the capacitor structure in both a double layer capacitance mode and a pseudo capacitance mode. The charged up capacitor is used to supply a backup voltage to a utilization device. In one embodiment, the anode includes a silver disk adjoining the electrolyte layer. In another embodiment, the anode contains platinized activated carbon and $RbAg_4I_5$ to reduce silver dendrite growth during charging. In another embodiment, a varying concentration of silver is included in the anode layer. A technique for parallel charging and serial discharging of a plurality of the capacitors is disclosed.

23 Claims, 6 Drawing Sheets

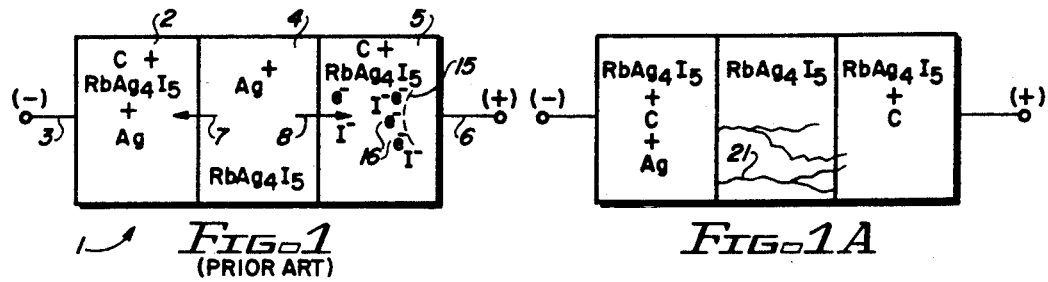
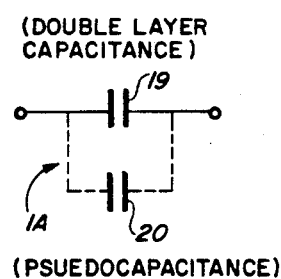
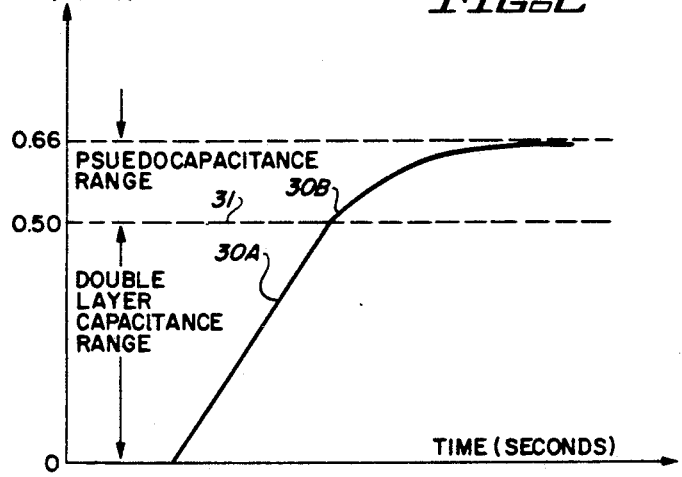
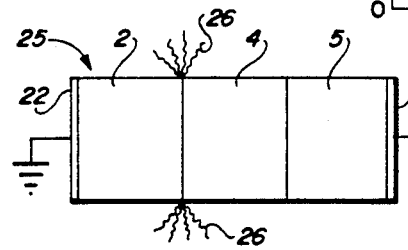
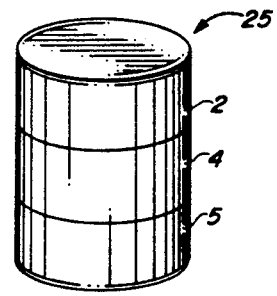
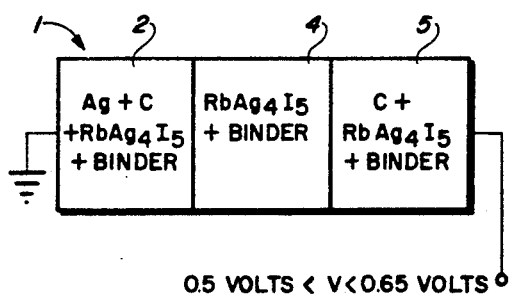
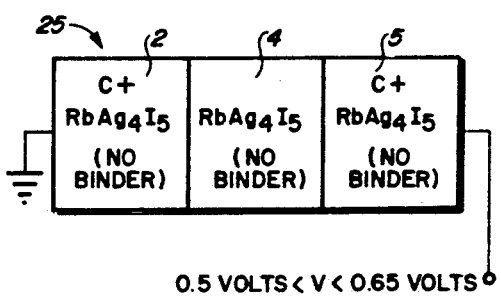

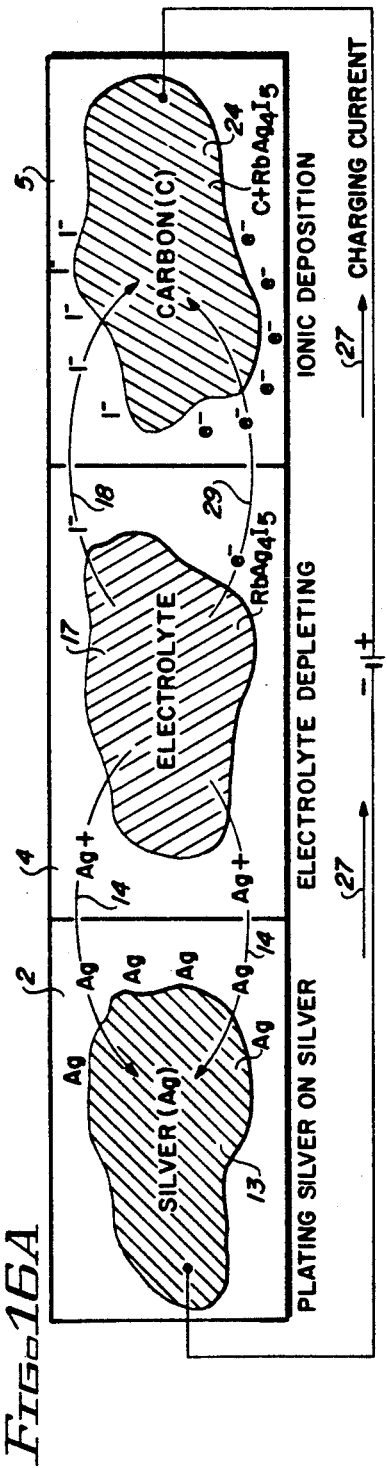
FIG. 16A
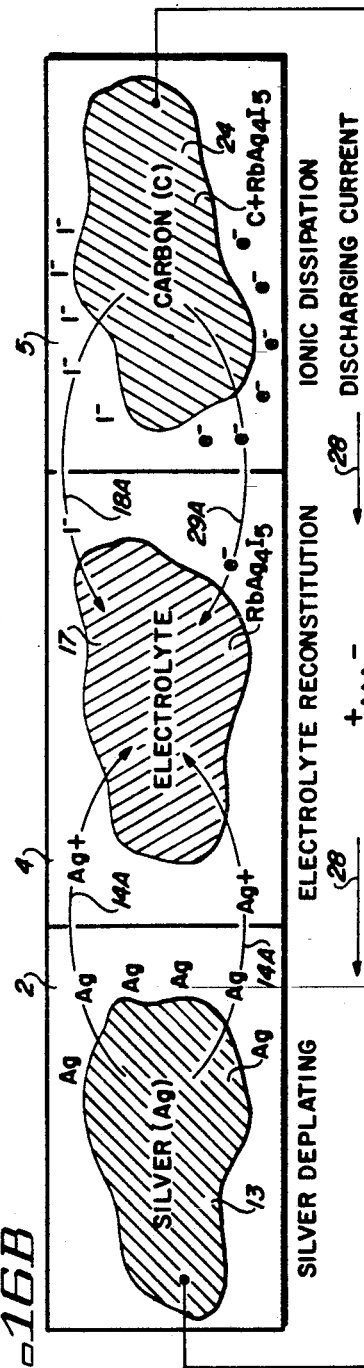
FIG. 16B
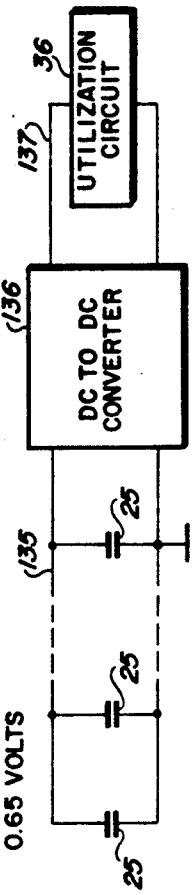
FIG. 19
FIG. 18

SOLID ELECTROLYTE CAPACITOR AND METHOD OF MAKING

CROSS-REFERENCE TO RELATED APPLICATION

This application is a continuation-in-part of the pending patent application entitled "Solid Electrolyte Capacitor and Method of Making", Ser. No. 562,234, filed Aug. 3, 1990 by John F. Bruder, assigned to the present assignee, which will issue as U.S. Pat. No. 5,047,899 on Sep. 10, 1991.

BACKGROUND OF THE INVENTION

The invention relates to a highly reliable solid electrolyte capacitor and method of making, and more particularly to a solid electrolyte capacitor including an anode and cathode each composed of carbon and $RbAg_4I_5$ and a solid electrolyte composed of $RbAg_4I_5$, and also to a method of using the capacitor in a pseudocapacitance mode to increase energy storage without causing dendrite growth that would electrically short the anode of the capacitor to the cathode thereof.

In this and the following discussion, the term "anode" will be used for the negative electrode and the term "cathode" will be used for the positive electrode, even though this terminology is strictly correct only for the discharge process.

Certain low voltage solid-state "electrochemical cells", perhaps more accurately referred to as "supercapacitors", are known and in some ways are advantageous compared to conventional batteries with respect to shelf-life stability, leak-free properties, and miniaturization. Such solid-state cells generally utilize silver as anode material and carbon capable of functioning as an electron receptor material for the cathode material. The solid electrolyte serves as an ionic conductor for the ionic part of the current within the solid-state cell. U.S. Pat. Nos. 3,701,685, 3,503,810, 3,443,997, 3,476,605, 3,647,549, 3,663,299, and 3,476,606 are generally indicative of the state of the art for such solid-state cells.

As indicated in "A Solid-State Energy Storage Device", published in "The Proceedings of the Power Sources Conference", No. 24, 1970, page 20, and as indicated in "A Solid-State Electrochemical Capacitor" by J. E. Oxley, published as Abstract No. 175 in a source unknown to applicant, of unknown date, the feasibility of constructing such a capacitor (hereinafter referred to as a "supercapacitor"), based on the "double layer capacitance" inherent in an electrode/solid electrolyte interface has been recognized. The first reference mentioned above describes a supercapacitor, on page 20, as one of the type under discussion charged to a voltage below 0.50 volts wherein silver is plated on silver already present in the anode during charging and a layer of electrons is formed on the surface of carbon contained in the cathode during the charging operation.

The second reference mentioned above describes the same supercapacitor cell, being charged to levels in the range from 0.50 volts to 0.65 volts. The same structure in this case is referred to as a "pseudocapacitor" wherein more of the silver is plated onto the anode, and in the cathode a monolayer of iodine ions is postulated to form on the surface of carbon contained in the cathode material. This has the result of increasing the energy storage by a factor of approximately 5 over the energy storage in the same supercapacitor structure if no iodine is being plated onto the cathode. This increase is postulated to result from the decreased dielectric separation.

The electrochemical capacitor disclosed in the above references uses the highly conducting solid electrolyte $RbAg_4I_5$. The anode of the basic cell system is composed of silver/$RbAg_4I_5$/carbon. The silver in the anode behaves as an electrode with very high capacitance, because the overvoltage necessary to plate silver on silver is very low.

At potentials between 0.50 volts and 0.66 volts, the $RbAg_4I_5$ is oxidized to form a monolayer of iodine at the carbon/electrolyte interface in the electrolyte contained in the cathode.

At applied potentials below 0.50 volts, the charge is stored as electrons on the surface of the carbon of the cathode. When a potential slightly above this range is imposed on the solid-state cell, the current decays to near zero as the required activity of iodine is established at the carbon/electrolyte surface. Thus, when a voltage in the range of 0.50 volts to 0.65 volts is applied between the cathode and anode, its charging behavior changes and this is termed the "pseudocapacitance" region of the solid-state cell's capacitance characteristic. At potentials greater than 0.66 volts, the electrolyte is decomposed. When the cell is charged into the pseudocapacitance region, the total energy stored in the solid-state cell increases to about 5 times that stored in the double layer region.

Before describing the present invention, it will be helpful to better understand the details of the closest prior art. In the prior art structure shown in FIG. 1, capacitor 1 has an anode 2 composed of activated carbon, silver and $RbAg_4I_5$. Anode 2 is connected by a conductor 3 to a negative voltage. Anode 2 abuts a solid dielectric 4 composed of pure $RbAg_4I_5$. The opposite face of solid electrolyte 4 contacts a cathode 5 composed of activated carbon and $RbAg_4I_5$. In prior art capacitor 1, the material of anode 2, solid electrolyte 4, and cathode 5 all include approximately one to two percent uniformly distributed LEXAN plastic material which serves as a binder for the particles of carbon and $RbAg_4I_5$ of which capacitor 1 is composed. Capacitor 1 of FIG. 1 is referred to as a "polar" structure because the anode and cathode are separately composed as described above for a specific polarity.

A problem with use of a plastic binder such as LEXAN in capacitor 1 is that it appears to encourage growth of silver dendrites from the anode to the cathode. FIG. 1A illustrates growth of such silver dendrites, which cause capacitor failure by short circuiting the anode and the cathode together.

If a constant charging current is supplied into positive cathode conductor 6, the voltage across capacitor 1 has the characteristic shown in segment 30A of FIG. 2. The voltage rises as indicated by segment 30A up to 0.50 volts. In the past, a number of workers have charged capacitor 1 to a voltage greater than 0.50 volts, thus adding the pseudocapacitor function. Segment 30A designates what is referred to herein as the "double layer" operating region of capacitor 1 and segment 30B is referred to herein as the "pseudocapacitor" operating region.

The charging circuit of capacitor 1 includes silver ions ($Ag^+$) flowing in the direction of arrow 7 from $RbAg_4I_5$ electrolyte layer 4 to anode layer 2. The charging current also includes electrons ($e^-$) flowing in the direction of arrow 8 from electrolyte 4 to cathode 5. A monolayer of such electrons are thought to become "plated" on activated carbon surface areas such as 15, possibly with a several angstrom gap maintained by molecular repulsive forces. The capacitance produced by the above mechanism is indicated by capacitor 19 in the schematic diagram of FIG. 3.

In FIG. 3, numeral 1A designates a schematic equivalent diagram of the capacitance of the supercapacitor 1 shown in FIG. 1. Capacitor 19 represents the "double layer capacitance" and capacitor 20 designates the "pseudocapacitance". Approximately eighty percent of the energy storage capacity of capacitor 1 is in the "pseudocapacitance" range 30 B of FIG. 2 when capacitor 1 is charged to a voltage of approximately 0.65 volts and twenty percent is in the "double layer" region 30A of FIG. 2 when capacitor 1 is charged to 0.50 volts. In the pseudocapacitance range, charge storage is thought to be due to accumulation of iodine ions on carbon surfaces of cathode 5.

The LEXAN binders mentioned above are thought to produce grains or growth paths in capacitor 1, particularly in $RbAg_4I_5$ of electrolyte 4, which encourage growth of the above-mentioned silver dendrites. Such silver dendrites, illustrated by numeral 21 in FIG. IA, may result in the primary failure mechanism of the prior art cell of FIG. 1.

There are numerous applications in which there is a need for a rechargeable cell that 1) can be completely discharged thousands of times, 2) is capable of operating reliably between −65 degrees Centigrade and +160 degrees Centigrade or higher, and 3) is highly reliable, with long lifetimes despite conditions of high temperatures and numerous repeated temperature cycles.

SUMMARY OF THE INVENTION

Accordingly, it is an object of the invention to provide an improved solid-state "supercapacitor" or "pseudocapacitor" cell which can be deeply discharged many times, and has a very long lifetime at both high and low temperatures.

It is another object of the invention to provide a practical method for making such a supercapacitor cell.

It is another object of the invention to provide a supercapacitor or a pseudocapacitor structure which avoids failure due to growth of silver dendrites.

It is another object of the invention to provide a technique for storing substantially more charge on a supercapacitor structure than has previously been achieved.

It is another object of the invention to provide a structure and technique for obtaining pseudocapacitor operation without providing silver particles distributed in the anode during manufacture of a pseudocapacitor structure.

It is another object of the invention to provide a supercapacitor structure with low series resistance, high current, high speed charging and discharging capability, and very low internal self-leakage.

It is another object of the invention to provide a practical solid-state supercapacitor module which can store approximately 5000 joules of energy and can deliver at least approximately 1 milliampere of current, and can be packaged in a module roughly 3 inches by 4 inches by 0.4 inches in size.

It is another object of the invention to provide pseudocapacitor structures which reduce migration of silver to surfaces of the anode during charging of the pseudocapacitors.

It is another object of the invention to provide an improved, efficient, reliable way of charging solid-state supercapacitors and generating an output voltage which is a multiple of the output voltage of a single supercapacitor.

It is another object of the invention to provide a supercapacitor which has more useful backup energy storage per unit volume than previously has been achieved.

Briefly described, and in accordance with one embodiment thereof, the invention provides a technique for supplying a backup voltage, including providing a solid-state electrochemical capacitor structure with a solid electrolyte composed of a layer of $RbAg_4I_5$, an anode composed of a layer of carbon and $RbAg_4I_5$ on a first surface of the electrolyte, and a cathode composed of a layer of carbon and $RbAg_4I_5$ on a second surface of the electrolyte. A current is supplied to charge the cathode of the capacitor structure to a voltage in the range from 0.50 volts to 0.66 volts to cause storage of charge in the capacitor structure in both a double layer capacitance mode and a pseudo capacitance mode. The charged up capacitor is used to supply a backup voltage to a CMOS memory. The capacitor structure is made by compressing the electrolyte, the anode, and the cathode together to produce physical bonding without binder material, using compression forces of more than approximately eighty thousand psi. The capacitor structures of the invention imply silver plating on an interface between the electrolyte and the carbon of the anode, whereby silver is presumably depleted from the electrolyte. All embodiments are designed to prevent or reduce growth of dendrites through or around the electrolyte layer which cause failure of the capacitor structure. In one embodiment, the anode is composed of a silver disk adjoining a surface of the electrolyte. In another embodiment, the anode includes platinized carbon which acts to perform a stable plating surface for migrating silver ions during the cell charging process, so as to greatly minimize formation of silver dendrites during the charging cycle. In another embodiment, the anode layer is composed of stable, silver-platable metal particles in sufficient concentration to substantially inhibit growth of silver dendrites during charging of the capacitor structure. In another embodiment of the invention, the anode includes varying concentrations of silver, the variation being selected to reduce dendrite growth and/or confine it to within the body of the anode during the charging process. In one embodiment of the invention, the electrolyte is formed by spreading a paste composed of electrolyte powder dissolved in a solvent on a cathode surface (formed of activated carbon and $RbAg_4I_5$) so as to fill gaps in an insulating spacer. A silver anode disk is pressed into the paste, and is kept separated from the cathode by the insulating spacer to form the anode. The solvent evaporates to produce a rigid pseudocapacitor structure. In one embodiment of the invention, a circuit and technique is described for charging a plurality of pseudocapacitors in parallel so that all are charged to precisely the same voltage, up to 0.66 volts. The circuit connects the pseudocapacitors in series to supply a backup voltage to a utilization device. In another embodiment of the invention, a plurality of pseudocapacitors are connected in parallel, and the voltage across them is applied to the input of a DC-to-DC converter to provide a boosted DC output voltage.

BRIEF DESCRIPTION OF THE DRAWINGS

FIG. 1 is a diagram of a prior art supercapacitor.

FIG. 1A is a diagram that illustrates dendrite growth and the way such dendrites cause failure of prior solid-state supercapacitor structures.

FIG. 2 is a graph useful in describing two modes of operating the prior art capacitor of FIG. 1.

FIG. 3 is a schematic diagram showing an equivalent circuit for the structure of FIG. 1 operated in accordance with FIG. 2.

FIG. 4 is a diagram of the supercapacitor of one embodiment of the present invention before removal of peripheral dendrites.

FIG. 5 is a perspective view of a supercapacitor of the present invention.

FIG. 7 is a diagram useful in comparing one embodiment of the supercapacitor of the present invention with the prior art supercapacitor of FIG. 1.

FIG. 16A is a diagram illustrating a proposed charging mechanism of the pseudocapacitor of the present invention.

FIG. 16B is a diagram illustrating discharging the pseudocapacitor of the invention.

FIG. 18 is a perspective view of a package containing the invention suitable for use as a backup power supply for a volatile memory system.

FIG. 19 is a diagram showing parallel connection of a number of pseudocapacitors of the present invention and use of a DC-to-DC converter to boost the pseudocapacitor voltage to a higher voltage.

DETAILED DESCRIPTION OF THE PREFERRED EMBODIMENTS OF THE INVENTION

Figure 6:
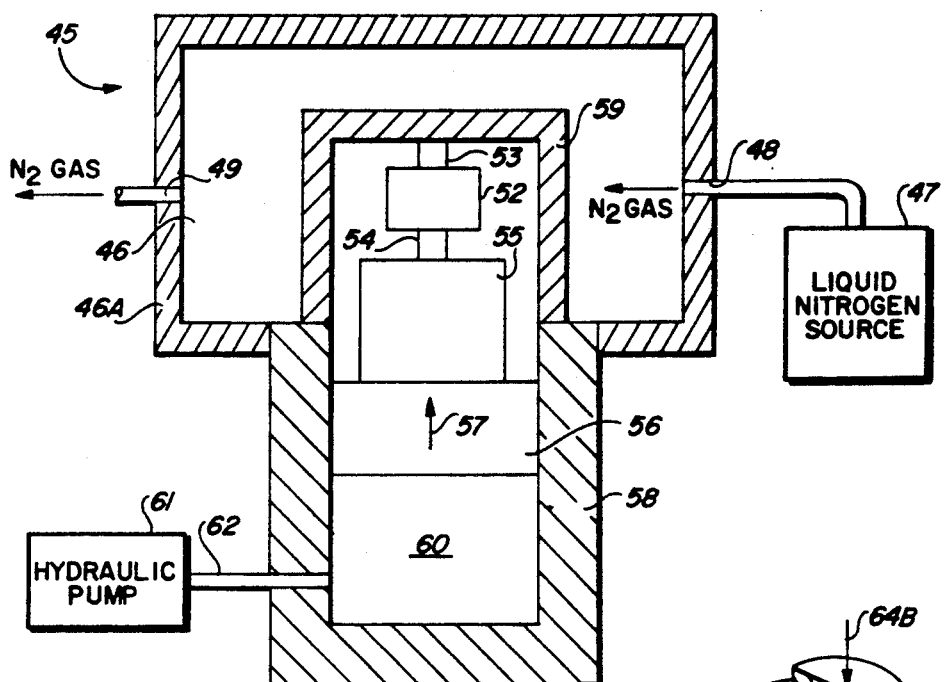
FIG. 6 is a diagram of an apparatus used in making the supercapacitor of FIG. 5.

Referring to FIG. 4, an initially nonpolar "supercapacitor" 25, made in accordance with one embodiment of the present invention, is referred to as "nonpolar" because anode 2 and cathode 5 are of identical composition. Supercapacitor 25, hereinafter referred to as pseudocapacitor 25, includes no binders such as the LEXAN used in prior art capacitor 1 of FIG. 1. Both anode 2 and cathode 5 are composed of activated carbon and $RbAg_4I_5$, and are formed by very high pressure compression, of the order of a 80,000 pounds per square inch (or lower pressure if the temperature of the material is increased). It is thought that the growth of dendrites 26 eventually adjusts composition of the cell by depleting silver ion concentration in solid electrolyte 4. When the dendrites thus formed are removed by brushing them away, no further failure mechanism due to dendrite growth can occur because of the depleted silver ion concentration in electrolyte layer 4. Consequently, a very temperature-stable, long life pseudocapacitor cell is obtained. It has been found that pseudocapacitor 25 can be discharged many thousands of times without affecting reliability or performance thereof. (Dendrites may also grow internally, but as long as they do not extend from the anode to the cathode, they do not effect the reliability or performance of pseudocapacitor 25.)

The manner in which pseudocapacitor 25 operates as a capacitance in the double layer mode and in the pseudocapacitance mode is the same as described in the above-mentioned Oxley references. However, for an initially non-polar structure, the prior art discloses operating only in the double layer region 30A of the curve of FIG. 2. Mr. Oxley claimed that this structure described in his articles could not be operated in the pseudocapacitance mode. (Perhaps because the nonpolar structure of the prior art supercapacitor structure which is identical to that of pseudocapacitor 25 has only half of the capacitance of a similar polar supercapacitor structure, and perhaps also because charging operation would be inefficient with no distributed silver in the anode for silver ions from the electrolyte layer 4 to plate onto).

In accordance with one embodiment of this invention, operating the nonpolar structure in the pseudocapacitance mode by charging it to voltages close to 0.65 volts causes peripheral dendrite growth which may deplete silver to the point where there is none left for producing internal dendrite growth sufficient to cause device failure due to cathode-to-anode shorting. The external dendrites 26 can be removed by brushing. The construction of the pseudocapacitor 25 probably enhances growth of peripheral dendrites substantially faster than internal dendrites, causing depletion of silver before any internal dendrites grow far enough from the anode to produce an electrical short to the cathode. (The capacitance of nonpolar capacitor 25 operated in the double layer region is one-half that of a polar cell because the anode and cathode capacitive layers are coupled in series).

FIG. 7 illustrates the distinguishing features of one embodiment of the present invention. The pseudocapacitor 25 of the present invention contains no silver particles in anode 2 or cathode 5. The closest prior art pseudocapacitor 1 includes silver particles in the anode material. Pseudocapacitor 25 of the present invention charges cathode 5 to voltages that encourage peripheral dendrites to grow, to thereby deplete silver available in electrolyte layer 4 and prevent future growth of internal dendrites that lead to short circuiting and failure of the capacitor. In contrast, pseudocapacitor 1 of the prior art may avoid using heavy currents when the structure is charged to voltages which cause dendrites to grow because dendrites are regarded as the prime failure mechanism of such structures.

Finally, no binders are used in electrolyte layer 4 of the pseudocapacitor 25 of the present invention. In the described embodiment, no binders are used in the anode layer 2 or the cathode layer 5 either, although in the future, with an increased proportion of carbon in anode 2 and cathode 5, some binders may be used in the electrodes but it is expected that binders will not be used in electrolyte layer 4. In contrast, supercapacitor 1 of the closest prior art uses binders in all three layers 2, 4, and 5.

The method of manufacturing prototypes of pseudocapacitor 25 of FIG. 5 is as follows.

EXAMPLE 1

Figure 6A:
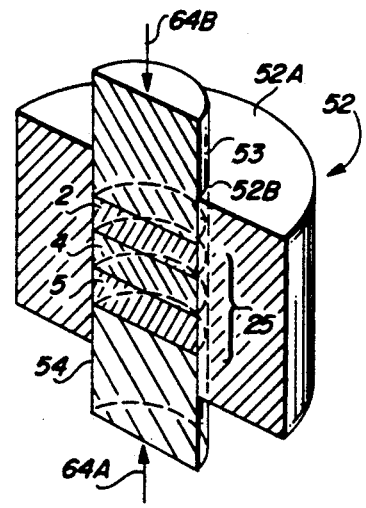
FIG. 6A is a partial section diagram of the die and compression members used to make the supercapacitor of FIG. 4.

Using the fabrication apparatus 45 of FIGS. 6 and 6A, nitrogen gas from source 47 passes inside a sealed chamber 46, so that an oxygen-free, moisture-free environment is provided for manufacture of the cell. It should be noted that if moisture is present in the electrolyte powder or the anode and cathode powder material, it will cause the pseudocapacitor structure formed to self-discharge more rapidly. Nitrogen gas enters chamber 46 through inlet 48, and is exhausted through exhaust port 49. Although not shown in FIG. 6, suitable manipulation means are provided to allow complete manufacture of the basic cell of pseudocapacitor 25 in the oxygen-free, moisture-free chamber 46 of FIG. 6. FIG. 6 schematically shows a workable manufacturing arrangement in which a U-shaped abutment member 59 extends into chamber 46, and is rigidly supported in fixed relationship to a hydraulic cylinder 58 having a hydraulically moveable piston 56 therein. A pedestal 55 on piston 56 supports a cylindrical hardened die 52 having two moveable cylindrical compression or thrust members 53 and 54 between which the anode layer 2, electrolyte layer 4, and cathode layer 5 are compressed, as best seen in FIG. 6A. A hydraulic pump 61 injects pressurized hydraulic fluid in the lower part 60 of hydraulic cylinder 58, producing upward force that moves piston 56 and pedestal 55 upward in the direction of arrow 57. U-shaped member 59 provides a downward counterforce 64B in opposition to the upward force 64A produced by pedestal 55 on the compression member 54. Cylindrical steel sleeve 52A is manufactured, which is formed of oil hardened tool steel to very close tolerance of about 0.001 inches. Compression members 53 and 54 also are formed of precision machined oil hardened tool steel. Using moderate pressure applied by hand within chamber 46, compression members 53 and 54 can be forced together to preform powder material into the layers 5, 4, and 2.

Compression members 53 and 54 fit so precisely into a cylindrical opening through cylindrical sleeve 52A that the seal is nearly airtight and essentially hermetic. Suitable apparatus, including airtight glove-like manipulation members by means of which an operator standing outside of chamber 46 can reach inside it and manipulate various tools, controls, and the like, can be utilized to prepare the electrolyte powder, and also the anode and cathode electrolyte/carbon powder mixtures, grind them into particles, remelt them, regrind them, pour layers 5, 4, and 2 individually into the opening 52B of die 52, manipulate compression members 53 and 54 to compress layers 5, 4, and 2 as subsequently described. Finally, a high compressive force, for example, eighty thousand pounds per square inch, is applied in chamber 46 on the combined preformed layers 2, 4, and 5 to produce a solid, unitary pseudocapacitor cell structure.

Figures 10A, 10B:
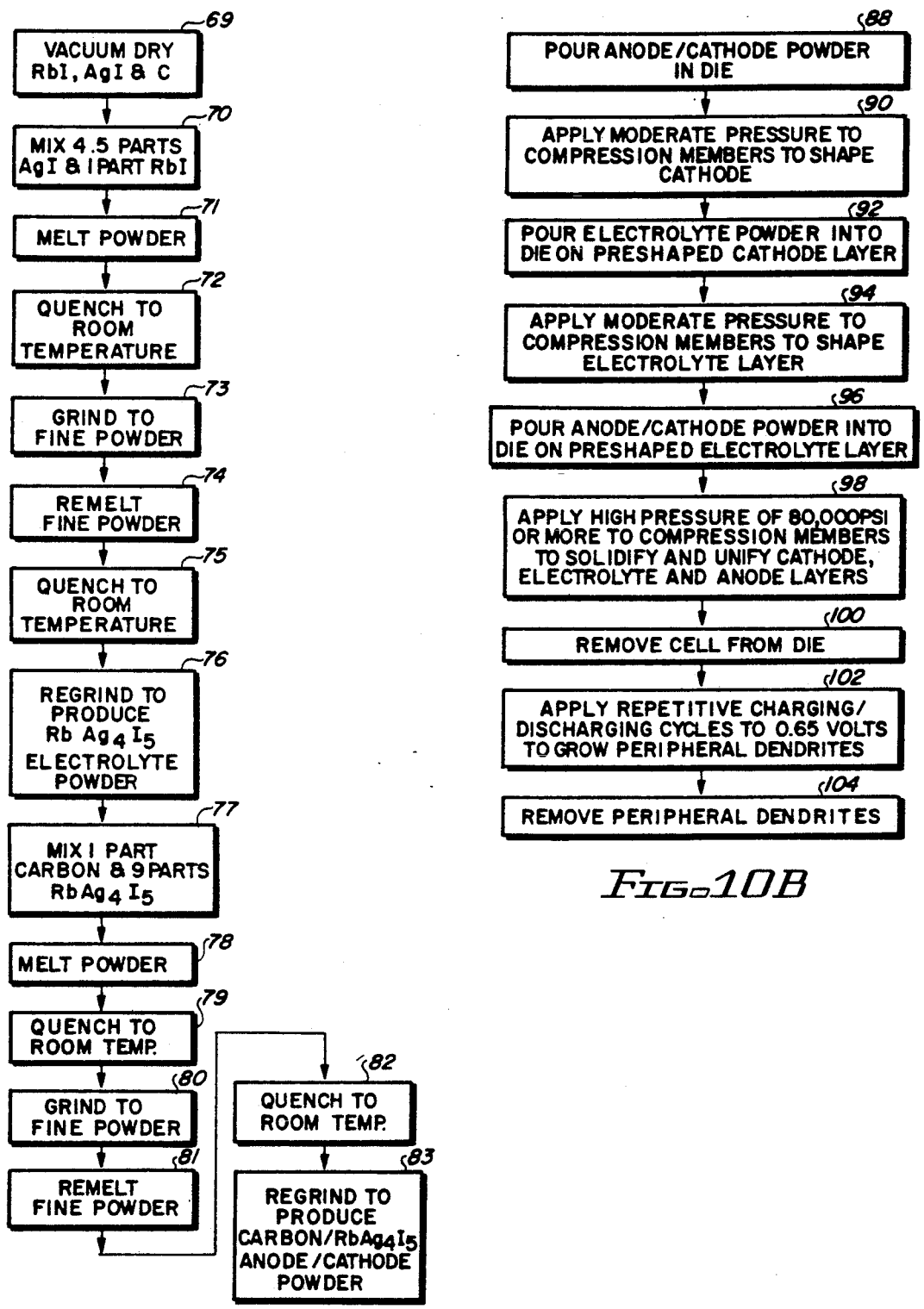
FIGS. 10A and 10B are flow diagrams of the method of making the supercapacitor of FIG. 4.

The following steps, referred to in the flowcharts of FIGS. 10A and 10B, preferably are performed in the oxygen-free, moisture-free environment of chamber 46.

As indicated in block 69 of FIG. 10A, RbI, AgI and activated carbon are vacuum dried and simultaneously heated within chamber 46 to remove all moisture. The RbI and the AgI then are mixed in the ratio of 4.5 parts of AgI to 1 part of RbI to form electrolyte powder, as indicated in block 70. As indicated in block 71, the electrolyte powder is heated in chamber 46 on a hot plate to roughly 300 degrees Centigrade (the melting point of the electrolyte powder being approximately 232 degrees Centigrade). The melted electrolyte then is cooled or quenched rapidly by pouring it on a stainless steel plate, as indicated by block 72. The resulting solidified electrolyte material then is broken and ground in chamber 46 with a mortar and pestle, as indicated in block 73 of FIG. 10A. The ground up electrolyte powder then is remelted in chamber 46 in the manner indicated above, as indicated in block 74 of FIG. 10A, and then is quenched as indicated in block 75, and reground to obtain a more complete reaction, as indicated in block 76 to produce the final electrolyte powder material.

In order to make carbon/RbAg$_4$I$_5$ anode 2 and the identical carbon/RbAg$_4$I$_5$ cathode 5 of pseudocapacitor 25, 9 parts of the ground RbAg$_4$I$_5$ electrolyte material are mixed with one part of activated carbon, as indicated in block 77. This mixture is melted, as indicated in block 78, in the manner described above, quenched as indicated in block 79, broken, and then ground using the mortar and pestle (all within chamber 46), as indicated in block 80. The resulting powder then is remelted, as indicated in block 81, again quenched, as indicated in block 82, broken and reground, as indicated in block 83 to form the carbon/RbAg$_4$I$_5$ anode material and cathode material.

After both the electrolyte powder and the anode/cathode powder have been formed as indicated in FIG. 10A, the supercapacitor structure 25 is formed using the apparatus of FIG. 6 in accordance with the process of FIG. 10B. The first step, as indicated in block 88 of FIG. 10B, is to pour a quantity of the anode/cathode powder into die 52, as indicated in block 88. Moderate pressure then is applied to force compression members 53 and 54 together. In the manufacture of the described prototypes, this is accomplished by hand, pressing the two thrust members 53 and 54 together and twisting them to form a uniform cathode layer 5 within die 52. Then the upper compression member 53 is removed from die 52. Next, as indicated in block 92 of FIG. 10B, a quantity of pure electrolyte powder is measured into die 52, forming electrolyte layer 4 on already preformed cathode layer 5. Compression member 53 is reinserted into opening 52B, and manipulated to press layer 4 against layer 5 and provide a uniform layer thickness. This step is indicated in block 94 of FIG. 10B.

Next, as indicated in block 96 of FIG. 10B, after compression member 53 again has been removed from die 52, a quantity of the carbon-RbAg$_4$I$_5$ powder mixture is poured into die 52 on top of preformed electrolyte layer 5. Compression member 53 again is repositioned in die 52. Opposed forces again are applied to compression members 53 and 54 to compress and preform anode layer 2 on preformed electrolyte layer 4, to thereby preform the entire pseudocapacitor cell structure 25. Then, as indicated in block 98, die 52 with pseudocapacitor 25 therein, is positioned on pedestal 55 as shown in FIG. 6, and hydraulic pump 61 is actuated to produce upward compression forces of eighty thousand pounds or more per square inch on compression member 54. This condition is maintained for several minutes, and solidifies the entire preformed supercapacitor structure 25. The next step in making the basic cell is removal of the solidified cell from die 52, as indicated in block 100 of FIG. 10B. The cell 25 then is repetitively charged and discharged, causing dendrites 26 to grow peripherally. Dendrites 26 then are brushed away, as indicated in block 102. It should be noted that in prototypes of supercapacitor cell structure 25 made to date, the diameter of the anode layer 2, electrolyte layer 4, and cathode layer 5 is 0.375 inches, although the same basic method could be utilized to make cells of any diameter. In the prototype cells made to date, the thickness of the cathode layer 5 is approximately 0.1 inches, the thickness of the electrolyte layer 4 is 0.1 inches, and the thickness of the anode layer 2 is approximately 0.1 inches. However, it would be practical to make the thicknesses in the range from 0.05 inches to 0.5 inches, depending on various consideration such as length of possible internal dendrites and the amount of internal cell resistance desired.

This pressure is sufficiently great that a need for binder material such as LEXAN is avoided. A durable pseudocapacitor 25 is thereby formed without any internal grains or paths for internal dendrite growth.

Anode 2 and cathode 5A are electrically contacted by refractory metal (e.g., tantalum, titanium, or molybdenum) electrodes 22 and 23 (See FIG. 4) to form the completed capacitor structure. (Pure carbon or graphite also could be used.) During the charging and discharging cycles, cathode 5 was charged up to 0.65 volts relative to anode 2. It is believed that silver plates onto the carbon-electrolyte interface, making the cell polar. In the described example, when the pseudocapacitor 25 was charged with a constant charging current of 0.0010 amperes, at voltages above 0.50 volts and less than 0.65 volts, a coat of silver mysteriously appeared on the cylindrical peripheral wall surface of anode layer 2. Even more mysteriously, after approximately two more hours of charging, the silver that has plated out migrates back into the anode structure and disappears. Then pseudocapacitor 25 was subjected to repeated charging and discharging cycles, as indicated in block 102 of FIG. 10B. This caused dendrites to initially grow on the outer edge surface of the cylindrical body of pseudocapacitor 25 at the junction between anode layer 2 and electrolyte layer 4, as indicated by numerals 26 in FIG. 4. Such dendrites later are brushed off, leaving a dendrite-free structure.

The migration of silver from solid electrolyte 4 to anode 2 probably accomplishes the same thing as the prior art technique of adding silver to the anode to make the capacitor polar. The migration of silver occurs only if the capacitor is charged to a voltage above 0.50 volts. The resulting depletion of silver from the solid electrolyte 4 as a result of the plating and dendrite growth prevents further dendrite growth (which can result in electrical shorting of the anode to the cathode), the main failure mechanism of prior art capacitor cells of this general type.

Figure 8:
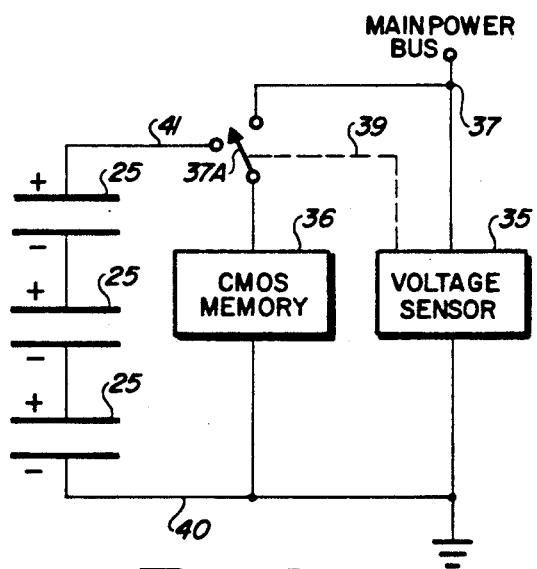
FIG. 8 is a diagram of a stack of the supercapacitors of the invention connected to provide a backup battery for a CMOS memory.
Figure 9:
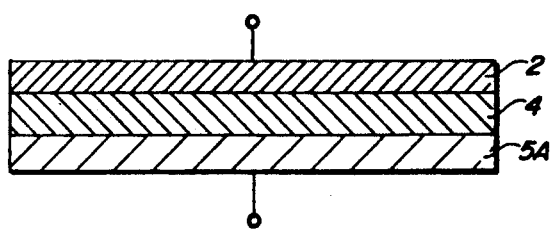
FIG. 9 is a diagram of an embodiment of the invention designed to provide a large discharge current.

FIG. 8 shows an application of a series-connected group of pseudocapacitors 25 of the present invention, each operated in its pseudocapacitance range. Individual supercapacitor cells 25 are connected in series as shown between conductors 40 and 41 to form a standby power supply for a CMOS memory 36 or other electronic circuitry. CMOS circuitry 36 is coupled by switch 37A between the main power bus 37 and ground conductor 40. A voltage sensor circuit 35 monitors the voltage on main power bus 37, and generates a switch control signal 39 if the voltage on main power bus 37 falls below a preset threshold, turning on switch 37A, so that the backup voltage on conductor 41 is connected to main power bus 37, providing backup power for CMOS memory 36. The use of the pseudocapacitors 25 as a backup energy source permits volatile memory storage elements in circuitry 36 to retain their data despite the loss of main power from bus 3 by closing switch 37A and supplying stand-by power from pseudocapacitors 25 without the need to provide corresponding non-volatile memory elements and circuitry and a procedure for transferring data from the volatile to the non-volatile memory elements. For example, some presently available 64 kilobit CMOS RAMs can retain data with a stand-by current of only ten nanoamperes at room temperature. This would allow a pseudocapacitor structure of the type shown in FIG. 8 to maintain data in such a CMOS memory at room temperature for roughly twenty years using pseudocapacitors of the type which are described herein.

In accordance with the present invention, all of the supercapacitor cells 25 are charged up to voltages between 0.50 volts and 0.66 volts, causing them to store most of their energy in the pseudocapacitance mode of segment 30B of FIG. 2.

Figure 11A:
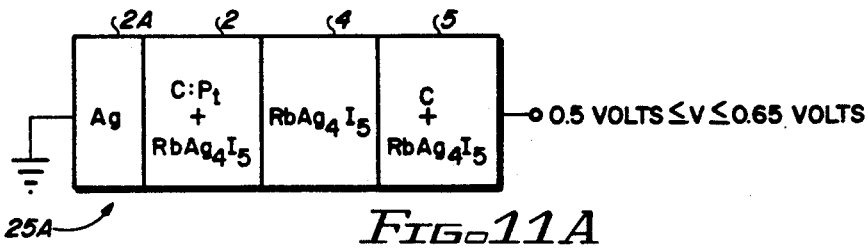
FIG. 11A is a diagram of another embodiment of the invention including platinized carbon in the anode.

FIG. 11A shows an improved pseudocapacitor 25A which is identical to pseudocapacitor 25 of FIG. 7 except that the anode 2 includes platinized activated carbon, rather than activated carbon. Platinized activated carbon, hereinafter referred to simply as platinized carbon, is activated carbon coated with a small amount (e.g., 5-10%) of platinum. This material is widely used in catalytic converters for automobiles, and is readily available commercially. A pseudocapacitor of this construction was manufactured in essentially the same manner previously described, with the amount of platinized carbon in the anode being the same as the proportion of activated carbon in the embodiment 25 of FIG. 7. The result of this construction was a great reduction in migration of silver to the anode surface and undesirable growth of dendrites 26 (referred to previously) at the edge between the anode layer 2 and the electrolyte layer 4. Internal growth of dendrites as illustrated in FIG. 1A probably was also greatly reduced. A pure silver layer 2A was attached to the outer surface of anode 2.

It is believed that during charging of pseudocapacitor 25A, illustrated in FIG. 16A, positively charged silver ions are moved from electrolyte layer 4 to anode layer 2 and need a large, stable, surface area to plate onto if migration of silver to the anode surface and formation of dendrites thereat is to be reduced or avoided.

The structure 25A of FIG. 11A was subjected to approximately 90 days of cycling by discharging it with a current of 1 milliampere every 4 hours and then discharging it for 4 hours for 90 days. Only a very small amount of black scale was observed along the peripheral interface between the electrolyte layer 4 and the anode layer 2, indicating very little migration of silver ions thereto. This experiment indicates that if a very large platable surface area is provided within the anode structure, migrating silver can be kept in the cell body, rather than plating out on the surface thereof. Erosion at peripheral anode-electrolyte interface was considerably reduced.

Figure 11B:
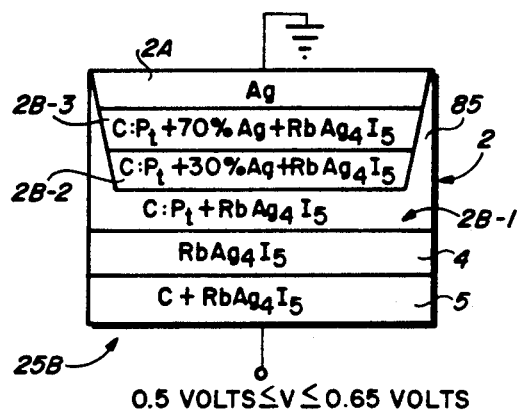
FIG. 11B is a diagram of another embodiment of the invention including a graded anode structure including platinized carbon, varying amounts of silver, and a pure silver contact layer.

FIG. 11B shows a later structure that was fabricated, using essentially the techniques described above to form the cathode, and electrolyte layers. In FIG. 11B, the anode layer 2 includes a bottom layer 2B-1 of platinized carbon formed in the same proportions as in the embodiment 25A of FIG. 11A. A truncated conical layer 2B-2 is formed on layer 2B-1 composed of $RbAg_4I_5$, platinized carbon, and 30% by weight silver. A third truncated conical layer 2B-3 composed of platinized carbon, $RbAg_4I_5$, and 70% by weight silver is formed on layer 2B-2. A top truncated conical layer 2A of pure silver is formed on layer 2B-3. The upwardly flared shape 85 of layer 2B-1 of anode 2 performs the function of confining any dendrite that might grow at the layer interfaces. After fabrication, this structure was subjected to approximately 30 days of cycling as described above for anode 2, and showed only a very slight color change around the edge of the anode layer.

In the pseudocapacitor 25 of FIG. 7, silver ions that migrate from the electrolyte layer 4 to the anode layer 2 during charging of the pseudocapacitor cell are believed to be deposited on carbon particles present in the anode layer. As described above, this structure leads to substantial growth of silver dendrites 26. Since dendrite growth is greatly reduced for the pseudocapacitors 25A of FIG. 11A and 25B of FIG. 12B, it is believed that the platinum coatings on the platinized carbon particles are a good reference metal (meaning that a low overvoltage is all that is required to cause plating of silver on it), which allows silver to be effectively plated onto the platinized carbon. Since the platinum is well affixed to the carbon, when the silver plates onto that platinum it does not tend to migrate as much in the anode layer 2. This is believed to reduce the amount of dendrite growth. Apparently, in pseudocapacitor 25 of FIG. 7 the silver deposited on the activated carbon did not attach nearly as well as it attaches to platinized carbon for the pseudocapacitor 25A of FIG. 11A.

It is not fully understood why the structure of the pseudocapacitor 25B of FIG. 11B resulted in yet less surface plating (dendrite growth) of silver. Possibly the platinum and silver combine to form a very high surface area matrix of high conductivity. In any case, the structure of pseudocapacitor cell 25B of FIG. 11B produces substantially less migration of silver to the surface during cell charging, and also has a substantially lower anode resistance, due to the presence of conductive silver. The reason for having the bottom layer 2B-1 composed of $RbAg_4I_5$ and carbonized platinum only is to effectively conduct silver ions into the high surface area material including layers 2B-2, 2B-3, and 2A.

To meet the objective of reducing pseudocapacitor cell resistance and increase cell charging and discharging current, electrolyte layer 4 can be made thinner. The anode layer 2 and cathode layer 5 also can be made thinner to slightly further reduce the cell resistance. Although no such experimental structures have been tested, it is believed that the structures of FIGS. 11A and 11B, which result in less migration of silver outside of the anode by providing efficient, uniform, stable silver plating sites within the anode structure, also will allow the electrolyte layer 4 to be made much thinner than in the embodiments actually fabricated because internal dendrite growth from the anode into the electrolyte layer 4 toward the cathode layer 5 should be greatly reduced.

The thickness of electrolyte area 4 can be made thick enough to provide a suitably high electronic resistance to result in a suitably low self-discharge current, but thin enough to provide an acceptably low ionic resistance. The "electronic" resistance (resistance to movement of electrons ($e^-$)) of $RbAg_4I_5$ is approximately $10^{11}$ ohms per cubic centimeter, so a $RbAg_4I_5$ electrolyte layer 4 about 0.3-0.8 inches in diameter and having a thickness of 0.1 inches could provide an electronic self-discharge current as low as $10^{-10}$ amperes, which would result in a charge storage time of hundreds of years.

Figure 12:
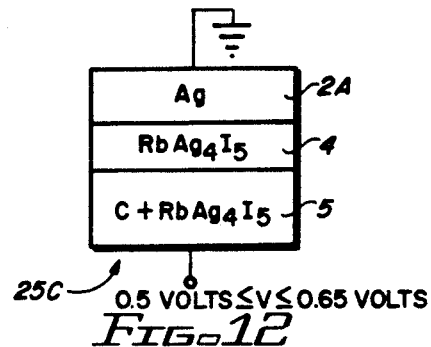
FIG. 12 is a diagram of an embodiment of the invention in which the anode is composed of pure silver or other metal with low silver plating overvoltage.

By making cathode layer 5 thinner and of larger diameter so as to maintain the same mass, the cathode resistance can be reduced. (It should be appreciated that the total capacitance of pseudocapacitor 25A of FIG. 11 or 25B of FIG. 12 is primarily a function of how much carbon there is in cathode layer 5, because the pseudocapacitance range shown in FIG. 2 arises from iodine ions adhering to carbon in the cathode, and this accounts for approximately 80 percent of the energy storage.) The resistance of cathode layer 5 is a function of its aspect ratio, i.e., ratio of diameter to thickness.

A pseudocapacitor cell configuration 25C is shown in FIG. 12, in which the anode is composed of a layer 2A of pure silver. In this embodiment, electrolyte layer 4 and cathode layer 5 were formed in essentially the same manner as previously described. Limited testing has occurred to date, but it performed as well as the embodiment of FIG. 11B, but some dendrite growth was observed. The structure of FIG. 11A was tested and continuously cycled for almost five months, without hermetic sealing. Repeatable results were obtained during most of this time, except during a time when the "dry box" failed and humidity measurements of several hundred parts per million of $H_2O$ were observed and the storage capacity of the pseudocapacitor 25C dropped to 2 milliampere hours. By heating the device in a dry oven, the measurements of 2 milliampere-hours increased approximately to their original levels of about 7 milliampere-hours.

On the basis of the foregoing results, it was hypothesized that an "ideal" pseudocapacitor would have a large mass cathode, a $RbAg_4I_5$ electrolyte layer 4 which is thin enough to exhibit sufficiently low "ionic resistivity" to provide the desired cell resistance, but thick enough to provide the desired high "electronic resistance" needed to prevent self-discharging of the pseudocapacitor cell. The ratio between the ionic resistance (which is about 5 ohms per cubic centimeter for $RbAg_4I_5$) of the $RbAg_4I_5$ electrolyte layer 4 and its electronic resistance (which is about $10^{11}$ ohms per cubic centimeter) characterizes the balance between rapid charging and very slow self-discharge of the pseudocapacitor cell. Such an "ideal" pseudocapacitor cell might have very thin anode composed of very low resistance material, such as silver, which has a low overvoltage with respect to electroplating by silver ions. Platinum might also work well.

Figure 13:
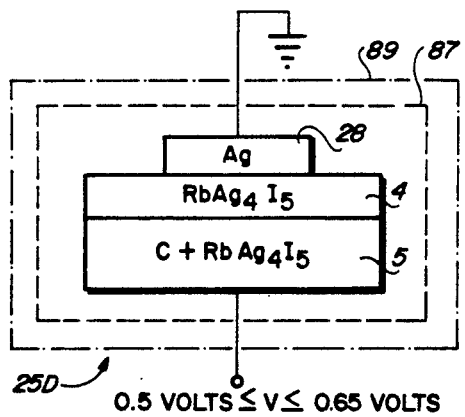
FIG. 13 is a diagram of another embodiment of the invention with a reduced-size anode of pure silver.

FIG. 13 shows a hypothetical embodiment 25D of the invention in which electrolyte layer 4 and cathode layer 5 are fabricated essentially as previously described. A thin pure silver disk 2A then is pressed against the outer surface of electrolyte layer 4 to form an anode layer. The diameter of silver disk anode 2A is significantly less than the diameter of electrolyte layer 4, so that any dendrite growth at the edge of the interface between silver disk 2A and electrolyte layer 4 cannot reach cathode 5, and cannot short-circuit the anode to the cathode. The pressure necessary to hold silver disk anode 2A against electrolyte layer 4 can be provided by a suitable resilient silicone packaging material, as indicated by dotted line 87. The pseudocapacitor 25D and resilient coating 87 can be further encapsulated within a suitable hermetic hard epoxy packaging material 89. Epoxy materials which shrink as they cool can provide further elastic pressure urging silver disk anode 2A permanently against electrolyte layer 4.

Figure 14:
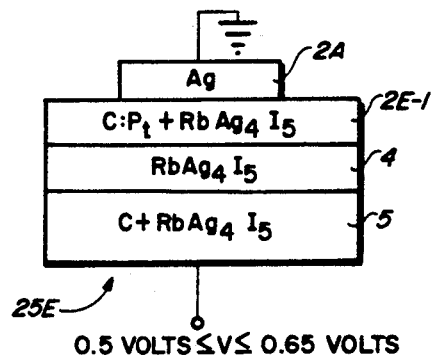
FIG. 14 is a diagram of another embodiment of the invention in which the anode includes a layer of platinized carbon and $RbAg_4I_5$ and a reduced-size layer of pure silver.

FIG. 14 shows a structure that is identical to the structure 25C shown in FIG. 13, except that a relatively thin anode layer 2D-1 composed of platinized carbon and $RbAg_4I_5$ formed as previously described is disposed between electrolyte layer 4 on silver disk 2A to provide a composite anode layer. It is believed that the thin layer 2E-1 of FIG. 14 effectively "intercepts" dendrites that otherwise would form along the interface between silver disk 2A and electrolyte layer 4.

Figures 15, 15A:
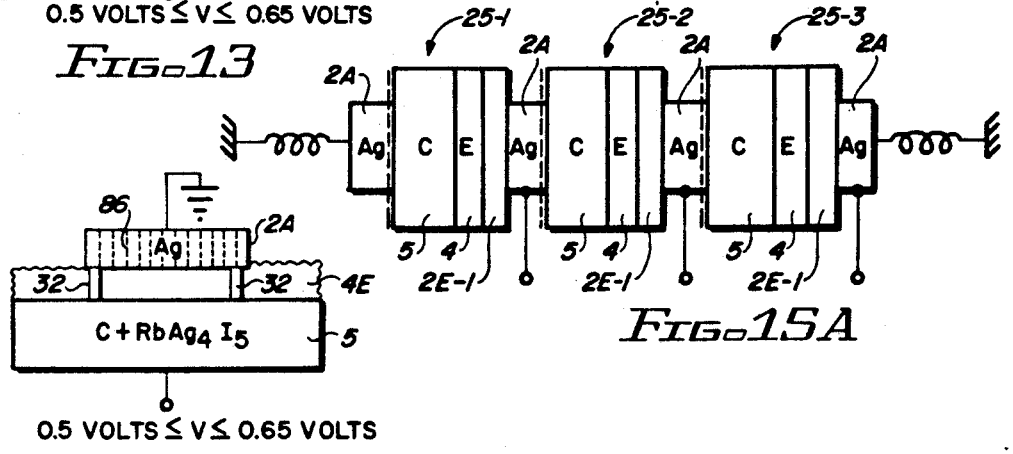
FIG. 15 is a diagram of another embodiment of the invention in which the electrolyte layer is formed from paste composed of $RbAg_4I_5$ particles.
FIG. 15A is a diagram of an embodiment of the invention convenient for packaging serially connected pseudocapacitors.

FIG. 15 shows another implementation of the invention which may be practical, in which a carbon and $RbAg_4I_5$ cathode layer 5 is formed essentially as previously described. A suitable "spacer" 32 (made of pressed nylon, for example) and an electrolyte paste made of $RbAg_4I_5$ powder and a suitable solvent such as acetone or pyridine, are pressed together against one surface of cathode layer 5 to form electrolyte layer 4E. A pure silver disk 2A, which may be perforated by very small holes 86 to allow evaporation of solvent from the paste, then is pressed against the paste and held there until it dries. Some of the paste flows into holes 86 and solidifies to strengthen the structure. The diameter of silver disk 2A is smaller than the diameter of cathode 5, so that any dendrite growth occurs far enough away from cathode 5 to prevent electrical shorting of anode 2A to cathode 5.

FIG. 15A shows a structure that may be utilized to conveniently package a series connection of multiple pseudocapacitors 25-1, 25-2, etc. Each pseudocapacitor includes a cathode layer 5 and an electrolyte layer 4, manufactured essentially as previously described. A silver disk 2A is pressed between a surface of the electrolyte layer 4 of one pseudocapacitor and the cathode layer 5 of an adjacent one. The dotted lines indicate an electrically conductive ion diffusion barrier, such as stainless steel or refractory metal. Electrical contacts are provided to each silver disk. If desired, a thin layer composed of platinized carbon and $RbAg_4I_5$, such as layer 2E-1 of FIG. 14, can be disposed between the electrolyte layer 4 and the silver disk 2A to reduce or eliminate dendrite growth. When a suitable number of such pseudocapacitors have been stacked together in this fashion, the structures are pressed together by two springs 3-3 and 3-4 that squeeze all of the pseudocapacitors together. Suitable conductors such as 3-1 and 3-2 make electrical connection to the silver disks to provide electrical access to all the terminals of the series-connected stack of pseudocapacitors so as to allow parallel charging of the individual pseudocapacitors in the fashion subsequently described with reference to FIG. 17B.

FIG. 16A illustrates what is believed to be the charging mechanism in the pseudocapacitors described above. Anode 2 contains sufficient silver or other stable plating sites for silver ions migrating as indicated by arrows 4 to confine the plating within the body of the anode structure. Silver ions from the $RbAg_4I_5$ of electrolyte layer 4 are being depleted, as shown. Pseudocapacitance storage is believed to occur by migration of iodine ions ($I^-$) and electrons ($e^-$) as indicated by arrows 18A and 29A to cathode layer 5. The iodine ions $I^-$ attach to carbon and electrons $e^-$ also attach to the activated carbon particles. The 0.65 voltage source causes the electrolyte reaction to occur and supplies charging current 27.

FIG. 16B illustrates what is believed to be the discharging mechanism of the pseudocapacitor as current 28 is discharged through a load resistance. It is believed that the electrolyte is re-constituted by accepting $I^-$ ions and electrons ($e^-$) from carbon 24 in cathode layer 5 and silver ions $Ag^+$ from anode 2, as indicated by arrows 18A, 29A, and 14A.

Figure 17A:
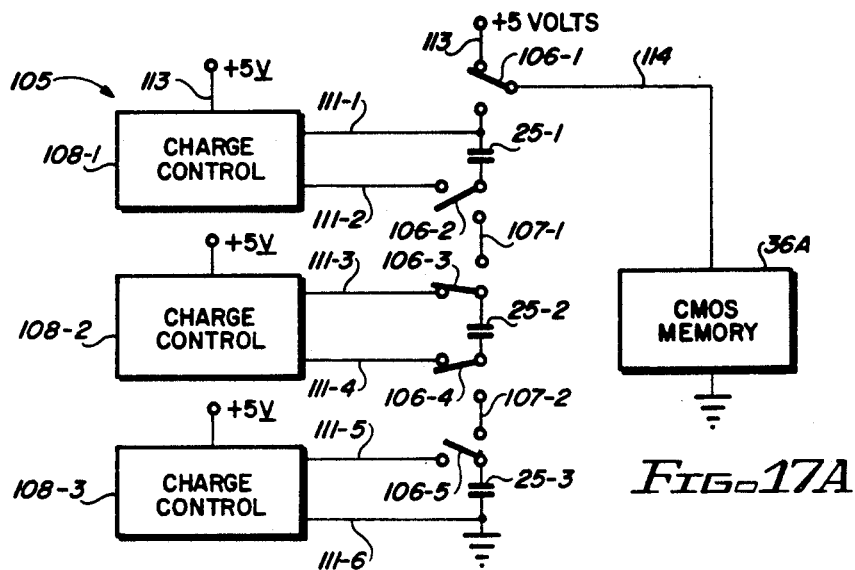
FIG. 17A is a diagram of a parallel charging, serial discharging technique for a backup power source including multiple pseudocapacitors of the invention.

FIG. 17A shows a circuit for fast, equal, and reliable charging and discharging of a group of pseudocapacitors. As previously mentioned, the pseudocapacitors must be stacked in order to provide sufficient voltage to function as a backup voltage source, for example for a memory circuit 36A. In FIG. 17A, three pseudocapacitor cells 25-1, 25-2, and 25-3 function as a backup power supply for memory circuit 36A. A +5 volt power supply voltage is supplied to conductor 113 and to three charge control circuits 108-1, 108-2, and 108-3. The outputs of charge control circuit 108-1 are connected by conductors 111-1 and 112-1 due to the two terminals of pseudocapacitor 25-1. Similarly, outputs of charge control circuit 108-2 are connected by conductors 111-2 and 112-2 to the opposite terminals of pseudocapacitor 25-2, and the outputs of charge control circuit 108-3 are similarly connected by conductors 111-3 and 112-3 to the terminals of pseudocapacitor 25-3. Switch 106-1 is connected by conductor 14 to the positive supply voltage terminal of memory 36A. During normal operation when the +5 volt supply voltage is present, switch 106-1 connects conductor 114 to conductor 113, and the three charge control circuits 108-1, 108-2, and 108-3 individually apply 0.65 volts to each of the three pseudocapacitors, charging them uniformly. If the 5 volt power supply voltage on conductor 113 fails, switches 106-1, 106-2, and 106-3 CMOS memory 36A in series with pseudocapacitors 25-1, 25-2, and 25-3, discharging then into conductor 114 to supply backup power to CMOS memory 36A.

Figure 17B:
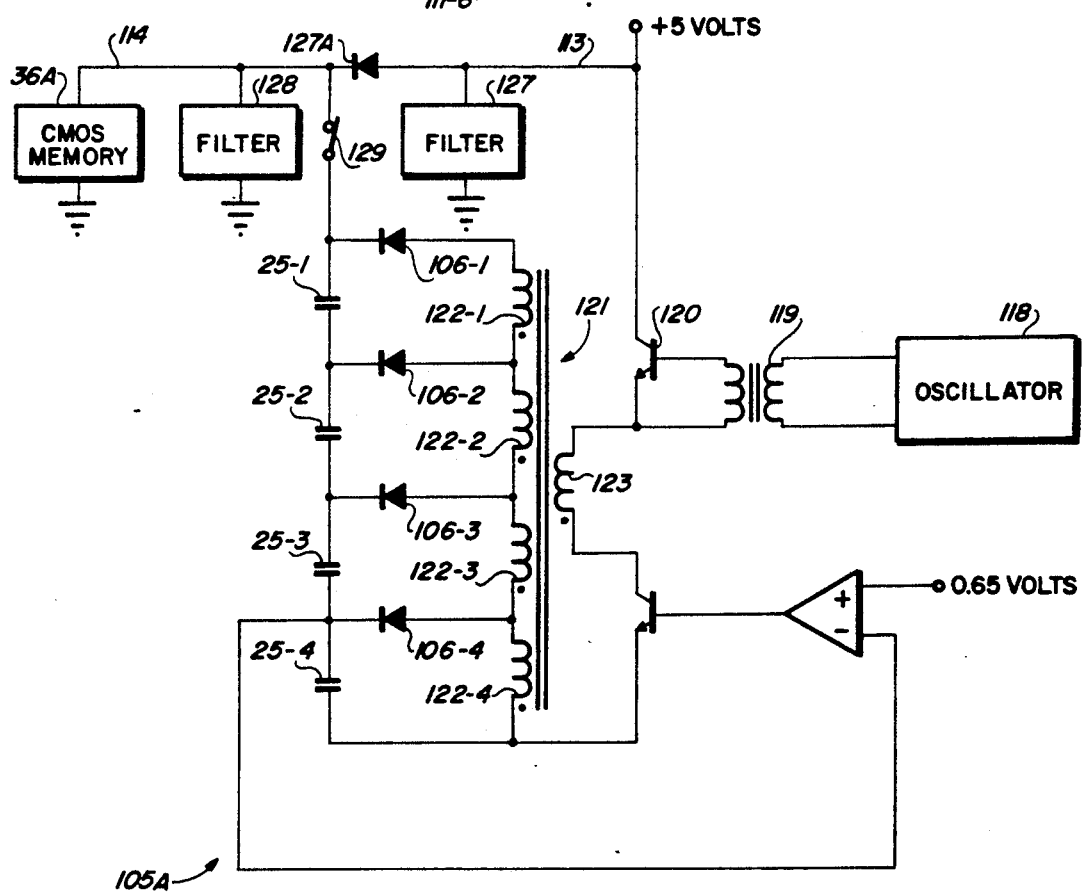
FIG. 17B is a circuit diagram illustrating a practical implementation of the structure shown in FIG. 17A.

A practical implementation of this concept is shown in FIG. 17B, in which four pseudocapacitors 25-1, 25-2, 25-3, and 25-4 are connected in series. Diodes 106-1, 106-2, 106-3, and 106-4 connect the terminals of four secondary windings 122-1, 122-2, 122-3, and 122-4 of transformer 121 to the terminals nodes of the four pseudocapacitors, respectively. A primary winding 123 of transformer 121 is connected between the emitter of NPN transistors 120 and the collector of NPN transistor 126. The collector of transistor 126 is connected to 5 volt power supply conductor 113, which also supplies power to an oscillator 118 that is coupled by an isolation transformer 119 across the base-emitter junction of transistor 120 to provide charging pulses to primary winding 123. The emitter of NPN transistor 126 is connected to the lower terminal of secondary winding 122-4 and to the lower terminal of pseudocapacitor 125-1 and to ground. The voltage across pseudocapacitor 25-4 is supplied to the inverting input of operational amplifier 125, which has its non-inverting input connected to a 0.65 reference voltage source and its output connected to the base of transistor 126. This regulates the charging current to a value that provides exactly the correct charging voltage across each of the secondary windings 122-1, 122-2, 122-3, and 122-4 which have identical inductance. It should be appreciated that if a charging voltage is applied across a group of series connected pseudocapacitors, voltage division across such pseudocapacitors will occur equally only if the capacitances are identical. If the capacitance of one of the pseudocapacitors decreases a bit, more of the charging voltage will be developed across it, possibly exceeding the 0.66 limit, further degrading the capacitance and causing the imbalance to accelerate. Rapid destruction of the device might follow. The above circuit avoids that problem and reliably charges each of the pseudocapacitors to its proper maximum safe storage voltage.

The backup voltage stored in the series connection of pseudocapacitors can be switched by a switch 129 to the output conductor 114 connected to a memory circuit 36A to provide backup power. Circuit 127 filters the 5 volt standards of the voltage on conductor 113. Diode 127A isolates conductor 114 from conductor 113 if the standard 5 volt supply voltage fails.

FIG. 18 shows a typical module in which a pseudocapacitor having 5000 joules of energy storage capacity using the structure provided herein can be packaged. The circuit shown in FIG. 17B is hermetically sealed in refractory metal material. It has dimensions of 3.0 inches by 4.0 inches by 0.4 inches. Terminals such as 134 extend from one edge of the package.

FIG. 19 shows a parallel connection of any suitable number of pseudocapacitors 25 each charged up to 0.65 volts in accordance with the invention. Conductor 135 connects the upper electrode of each pseudocapacitor 25 to one input of a DC-to-DC converter 136. The lower terminal of each pseudocapacitor 25 is connected to ground and to the other input of DC-to-DC converter 136. One output of converter 136 is connected to ground, and the other is connected by conductor 137 to a utilization circuit 36, such as a CMOS memory. DC-to-DC converter can boost the 0.65 DC voltage on conductor 135 to a suitable value, for example, +5 volts. There is a variety of know DC-to-DC converter circuits which have the capability of boosting a 0.65 volt level to a suitable DC level. For example, low threshold CMOS manufacturing processes can be used to make voltage doubler circuits or voltage booster circuits. Or, low threshold FET switches could be utilized to chop the DC voltage applied to the primary winding of a transformer, the secondary winding of which produces an amplified chopped voltage. The chopped voltage then is converted by various known rectifying and filtering techniques into a steady DC output voltage.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the described embodiments of the invention utilize ninety percent $RbAg_4I_5$ by weight and ten percent carbon for the anode and cathode materials, which are the proportions taught by the literature. Further experimentation in which the proportion of carbon may be increased should yield a higher density of energy storage because the amount of carbon should be generally proportional to the amount of charge that can be stored in the supercapacitor structure. This may lead to increased difficulty in keeping the anode and cathode powder particles adherent to each other to form solid anode and cathode structures. This in turn may lead to the need to utilize higher compressive pressures in manufacture of the supercapacitor structure, and may also lead to the need to use small amounts of binder material, such as LEXAN, in the anode material and cathode material, and possibly in the electrolyte layer. Although in the described embodiment the anode, electrolyte, and cathode disks are formed together in the same chamber, before the high pressure step is performed, it might be desirable to preform the three disks separately to increase the purity of each, and then place the preformed disks in the high compression chamber for the final high pressure compression step. Other techniques for forming the $RbAg_4I_5$ are known in the prior art. The constituent components can be dissolved in the solvent such as acetone or pyridine, causing the $RbAg_4I_5$ to be formed. The remaining solution is removed and evaporated, but the resulting $RbAg_4I_5$ has some silver iodide and other high resistance chemicals therein, and does not function as efficiently as an electrolyte that made by the above-described process. The electrolyte layer may be made thinner than in the described embodiment of the invention, as long as any internal dendrites that may have grown during depletion of silver from electrolyte layer 4 do not extend therethrough. The anode and cathode also quite possibly be made thinner. The activated carbon can be coated with other noble metals than platinum, such as palladium, to provide stable sites for plating of silver during the charging process. The positive electrodes could include platinized, activated carbon rather than activated carbon, which might appreciably lower their resistance. Other alkali metals than rubidium can be used to form the electrolyte layers, but they are not as effective as rubidium.

What is claimed is:

1. A method of storing a large amount of backup energy, comprising the steps of:
   (a) providing a capacitor structure including a solid electrolyte composed of a layer of $RbAg_4I_5$, a negative electrode composed of silver adjoining a first surface of the electrolyte, and a positive electrode composed of a layer of activated carbon and $RbAg_4I_5$ adjoining a second surface of the electrolyte;
   (b) supplying a current to charge up the positive electrode of the capacitor structure to a voltage in the range from 0.50 volts to 0.66 volts to cause storage of charge in the capacitor structure in both a double layer capacitance mode and a pseudocapacitance mode and to cause silver to deposit in the negative electrode.

2. The method of claim 1 including supplying the backup voltage to a utilization device.

3. A capacitor structure for storing backup energy, comprising in combination:
(a) a layer of solid electrolyte material composed of $RbAg_4I_5$;
(b) a layer of negative electrode material composed of silver and adjoining a first surface of the electrolyte material;
(c) a layer of positive electrode material composed of activated carbon and $RbAg_4I_5$ and adjoining a second surface of the electrolyte material parallel to the first surface; and
(d) means for charging the capacitor structure to produce a voltage of 0.50 volts to 0.66 volts between the negative electrode material and the positive electrode material, to thereby cause storage of charge in a double layer capacitance mode and also in a pseudocapacitance mode and to cause silver to deposit in the negative electrode.

4. The capacitor structure of claim 3 including silver deposited on carbon particles in the negative electrode material, whereby silver is substantially depleted from the electrolyte material, preventing further growth of dendrites which cause failure of the capacitor structure.

5. A capacitor structure for storing backup energy, comprising in combination:
(a) a layer of solid electrolyte material composed of $RbAg_4I_5$;
(b) a layer of negative electrode material composed of stable silver-platable metal particles in sufficient concentration to substantially inhibit growth of silver dendrites during charging of the capacitor structure and adjoining a first surface of the electrolyte material;
(c) a layer of positive electrode material composed of activated carbon and $RbAg_4I_5$ and adjoining a second surface of the electrolyte material parallel to the first surface; and
(d) means for charging the capacitor structure to produce a voltage of 0.50 volts to 0.66 volts between the negative electrode material and the positive electrode material, to thereby cause storage of charge in a double layer capacitance mode and also in a pseudocapacitance mode and to cause silver to deposit on the silver-platable particles in the negative electrode.

6. A method of supplying standby power for a utilization device, comprising the steps of:
(a) providing a capacitor structure including a solid electrolyte composed of a layer of $RbAg_4I_5$, a negative electrode composed of silver adjoining a first surface of the electrolyte, and a positive electrode composed of a layer of activated carbon and $RbAg_4I_5$ adjoining a second surface of the electrolyte;
(b) supplying a current to charge up the positive electrode of the capacitor structure to a voltage in the range from 0.50 volts to 0.66 volts to cause storage of charge in the capacitor structure in both a double layer capacitance mode and a pseudocapacitance mode;
(c) sensing a condition in which the utilization device requires application of standby power thereto;
(d) electrically connecting electrodes of the capacitor structure to power terminals of the utilization device.

7. A method of storing a large amount of backup energy, comprising the steps of:
(a) providing a capacitor structure including a solid electrolyte composed of a layer of $RbAg_4I_5$, a negative electrode composed of a layer of silver and a layer of noble metal coated activated carbon and $RbAg_4I_5$, the layer of silver adjoining a first surface of the layer of noble metal coated activated carbon and $RbAg_4I_5$, a second surface of the layer of noble metal coated activated carbon and $RbAg_4I_5$ adjoining a first surface of the electrolyte, and a positive electrode composed of a layer of activated carbon and $RbAg_4I_5$ adjoining a second surface of the electrolyte;
(b) supplying a current to charge up the positive electrode of the capacitor structure to a voltage in the range from 0.50 volts to 0.66 volts to cause storage of charge in the capacitor structure in both a double layer capacitance mode and a pseudocapacitance mode and to cause silver to deposit in the negative electrode.

8. The method of claim 7 wherein the noble metal is platinum.

9. A capacitor structure for storing backup energy, comprising in combination:
(a) a layer of solid electrolyte material composed of $RbAg_4I_5$;
(b) a negative electrode composed of a layer of silver and a layer of noble metal coated activated carbon and $RbAg_4I_5$, the layer of silver adjoining a first surface of the layer of noble metal coated activated carbon and $RbAg_4I_5$, a second surface of the layer of noble metal coated activated carbon and $RbAg_4I_5$ adjoining a first surface of the electrolyte material;
(c) a layer of positive electrode material composed of activated carbon and $RbAg_4I_5$ and adjoining a second surface of the electrolyte material parallel to the first surface; and
(d) means for charging the capacitor structure to produce a voltage of 0.50 volts to 0.66 volts between the negative electrode material and the positive electrode material, to thereby cause storage of charge in a double layer capacitance mode and also in a pseudocapacitance mode and to cause silver to deposit on the negative electrode.

10. The capacitor structure of claim 9 wherein the noble metal is platinum.

11. The capacitor structure of claim 9 including silver deposited in the negative electrode material, whereby silver is substantially depleted from the electrolyte material, preventing further growth of dendrites which cause failure of the capacitor structure.

12. A method of storing a large amount of backup energy, comprising the steps of:
(a) providing a capacitor structure including a solid electrolyte composed of a layer of $RbAg_4I_5$, a negative electrode adjoining a first surface of the electrolyte, and a positive electrode composed of a layer of activated carbon and $RbAg_4I_5$ adjoining a second surface of the electrolyte, the negative electrode being composed of a first layer of noble metal coated activated carbon and $RbAg_4I_5$ adjoining the first surface of the electrolyte, a second layer of noble metal coated activated carbon, $RbAg_4I_5$, and a first percentage of silver adjoining the first layer, a third layer of noble metal coated activated carbon, RbAg$_4$I$_5$, and a second percentage of silver adjoining the second layer, and a fourth layer of silver adjoining the third layer; and (b) supplying a current to charge the positive electrode of the capacitor structure to a voltage in the range from 0.50 volts to 0.66 volts to cause storage of charge in the capacitor structure in both a double layer capacitance mode and a pseudocapacitance mode and to cause silver to deposit in the negative electrode.

13. A method of storing a large amount of backup energy, comprising the steps of:

(a) providing a capacitor structure including a solid electrolyte composed of a layer of RbAg$_4$I$_5$, a negative electrode adjoining a first surface of the electrolyte, and a positive electrode composed of a layer of activated carbon and RbAg$_4$I$_5$ adjoining a second surface of the electrolyte, the negative electrode being composed of RbAg$_4$I$_5$ and a graded concentration of silver adjoining the first surface of the electrolyte; and (b) supplying a current to charge the positive electrode of the capacitor structure to a voltage in the range from 0.50 volts to 0.66 volts to cause storage of charge in the capacitor structure in both a double layer capacitance mode and a pseudocapacitance mode and to cause silver to deposit in the negative electrode.

14. A capacitor structure for storing a large amount of backup energy, comprising in combination:

(a) a layer of solid electrolyte composed of a layer of RbAg$_4$I$_5$;

(b) a layer of negative electrode material adjoining a first surface of the electrolyte, the negative electrode being composed of a first layer of noble metal coated activated carbon and RbAg$_4$I$_5$ adjoining the first surface of the electrolyte, a second layer of noble metal coated activated carbon, RbAg$_4$I$_5$, and a first percentage of silver adjoining the first layer, a third layer of noble metal coated activated carbon, RbAg$_4$I$_5$, and a second percentage of silver adjoining the second layer, and a fourth layer of silver adjoining the third layer;

(c) a layer of positive electrode material composed of a layer of activated carbon and RbAg$_4$I$_5$ adjoining a second surface of the electrolyte; and (d) means for supplying a current to charge the positive electrode of the capacitor structure to a voltage in the range from 0.50 volts to 0.66 volts to cause storage of charge in the capacitor structure in both a double layer capacitance mode and a pseudocapacitance mode and to cause silver to deposit in the negative electrode.

15. The capacitor structure of claim 14 wherein the first percentage is approximately 30% by weight and the second percentage is approximately 70% by weight.

16. A method of making a pseudocapacitor, comprising the steps of:

(a) providing a layer of positive electrode material composed of activated carbon and RbAg$_4$I$_5$;

(b) spreading a layer of paste containing RbAg$_4$I$_5$ and solvent on the layer of positive electrode material;

(c) placing a silver disk on the layer of paste and allowing the solvent to evaporate.

17. The method of claim 16 including providing an insulating spacer in the paste and pressing the silver disk against the insulating spacer.

18. The method of claim 16 wherein step (c) includes allowing some of the solvent to evaporate through small holes in the silver disk.

19. A system for charging a plurality of pseudocapacitors connected to supply a predetermined backup voltage to a utilization circuit, comprising in combination:

(a) a plurality of charge control circuit means for charging each of the pseudocapacitors to a voltage of up to approximately 0.66 volts coupled to the plurality of pseudocapacitors, respectively.

(b) first means for coupling the plurality of pseudocapacitors in series with the utilization circuit when the backup voltage is needed by the utilization circuit; and (c) second means for coupling the plurality of charge control circuit means to the plurality of pseudocapacitors, respectively, to effectuate parallel charging of the pseudocapacitors, wherein, the plurality of charge control circuits include a plurality of secondary windings of a transformer, respectively, the first means includes a plurality of conductors connecting the plurality of pseudocapacitors in series, and the second means includes a plurality of switches connecting a first terminal of each of the secondary windings to a terminal of each of the pseudocapacitors, respectively.

20. The system of claim 19 including a primary winding of the transformer, an oscillator circuit driving the primary winding, and a sensing control circuit connected to compare the voltage across one of the pseudocapacitors to a reference voltage of approximately 0.66 volts and control the current through the primary winding to cause each of the charge control circuits to produce a 0.66 voltage output voltage across the plurality of pseudocapacitors, respectively.

21. A pseudocapacitor voltage source, comprising in combination:

(a) a plurality of pseudocapacitors pressed together, each including a layer of positive electrode material composed of activated carbon and RbAg$_4$I$_5$, a layer of electrolyte material composed of RbAg$_4$I$_5$, and a layer of negative electrode material;

(b) a plurality of silver disks, each functioning as an electrical contact electrode of a layer of positive electrode material of one pseudocapacitor and electrically contacting the layer of negative electrode material of an adjacent pseudocapacitor, respectively;

(c) resilient means disposed on one side of the plurality of pseudocapacitors, pressing them together; and (d) means for electrically contacting each of the silver disks to allow electrical connection to charge each pseudocapacitor.

22. A pseudocapacitor voltage source, comprising in combination:

(a) a plurality of pseudocapacitors each including
  i. a layer of solid electrolyte material composed of RbAg$_4$I$_5$,
  ii. a layer of negative electrode material composed of stable silver-platable metal particles in sufficient concentration to substantially inhibit growth of silver dendrites during charging of the capacitor structure adjoining a first surface of the electrolyte material;

iii. a layer of positive electrode material composed of activated carbon and $RbAg_4I_5$ adjoining a second surface of the electrolyte material parallel to the first surface;

(b) means for charging the capacitor structure to produce a voltage of 0.50 volts to 0.66 volts between the negative electrode material and the positive electrode material, to thereby cause storage of charge in a double layer capacitance mode and also in a pseudocapacitance mode and to cause silver to deposit on the silver-platable particles in the negative electrode;

(c) means connecting the plurality of pseudocapacitors in parallel; and (d) a DC-to-DC converter connected to the connecting means to boost the voltage across the plurality of pseudocapacitors to a predetermined higher voltage.

23. A system for charging a plurality of pseudocapacitors connected to supply a predetermined backup voltage to a utilization circuit, comprising in combination:

(a) a plurality of electrically floating controlled current sources coupled to the plurality of pseudocapacitors, respectively, the plurality of pseudocapacitors being connected in series, and charge control circuit means for controlling the currents produced by the current sources, the current sources charging each of the pseudocapacitors, respectively, to a voltage of up to approximately 0.66 volts coupled to the plurality of pseudocapacitors, respectively;

(b) means for controllably connecting the pseudocapacitors across the utilization circuit; and (c) switching means for operatively coupling the plurality of controlled current sources to the plurality of pseudocapacitors, respectively, to effectuate parallel charging of the pseudocapacitors.

* * * * *